United States Patent
Boetje et al.

(10) Patent No.: US 8,510,317 B2
(45) Date of Patent: Aug. 13, 2013

(54) PROVIDING SEARCH RESULTS BASED ON KEYWORD DETECTION IN MEDIA CONTENT

(75) Inventors: Michael Boetje, Lawrenceville, GA (US); Steven Hite, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 531 days.

(21) Appl. No.: 12/328,412

(22) Filed: Dec. 4, 2008

(65) Prior Publication Data

US 2010/0145938 A1 Jun. 10, 2010

(51) Int. Cl.
*G06F 17/30* (2006.01)

(52) U.S. Cl.
USPC .......................................... 707/755

(58) Field of Classification Search
CPC .................................. G06F 17/2705
USPC ........................................ 707/755
See application file for complete search history.

(56) References Cited

U.S. PATENT DOCUMENTS

| | | | |
|---|---|---|---|
| 6,480,819 B1 | 11/2002 | Boman | |
| 6,925,649 B2 * | 8/2005 | Schwalb et al. | 725/32 |
| 6,999,957 B1 * | 2/2006 | Zamir et al. | 707/673 |
| 2007/0005338 A1 * | 1/2007 | Vrijsen | 704/3 |
| 2007/0027844 A1 * | 2/2007 | Toub et al. | 707/3 |
| 2007/0041706 A1 * | 2/2007 | Gunatilake | 386/95 |
| 2007/0061326 A1 * | 3/2007 | Stading et al. | 707/10 |
| 2007/0233857 A1 * | 10/2007 | Cheng et al. | 709/224 |
| 2008/0033986 A1 * | 2/2008 | McCusker et al. | 707/102 |
| 2008/0111822 A1 * | 5/2008 | Horowitz et al. | 345/530 |
| 2008/0189736 A1 * | 8/2008 | Edwards et al. | 725/34 |
| 2009/0043739 A1 * | 2/2009 | Choi | 707/3 |
| 2009/0063279 A1 * | 3/2009 | Ives et al. | 705/14 |
| 2009/0172746 A1 * | 7/2009 | Aldrey et al. | 725/61 |
| 2009/0235312 A1 * | 9/2009 | Morad et al. | 725/44 |

OTHER PUBLICATIONS

John R. Smith et al., "Multimedia Research Challenges for Industry", Springer CIVR 2005, LNCS 3568, (2005), pp. 28-37.*
Zhu Liu et al., "Multimedia Content Acquisition and Processing in the MIRACLE System", Proceedings of the IEEE CCNC 2006, (2006), pp. 272-276.*
Alan Messer et al., "SeeNSearch: A Context Directed Search Facilitator for Home Entertainment Devices", Elsevier, Journal of Pervasive and Mobile Computing 4 (Sep. 17, 2008), pp. 871-888.*

* cited by examiner

*Primary Examiner* — Rehana Perveen
*Assistant Examiner* — Scott A Waldron
(74) *Attorney, Agent, or Firm* — Guntin & Gust, PLC; Andrew Gust (57) ABSTRACT

A method includes accessing a cookie file from a media receiver via a network. The method includes detecting an occurrence of the keyword (selected from the cookie file) within a portion of a media content stream. The method includes identifying one or more additional words that are located within a number of words from a location corresponding to an occurrence of the keyword within the portion of the stream of media content. The method includes filtering the one or more additional words to exclude at least one black listed word to produce a filtered search set. The method includes providing a search result in response to locating the keyword. The search result is based on an Internet search conducted using the keyword and the filtered search set, and is made accessible via a display device after the portion of the media content stream is made available via the display device.

23 Claims, 6 Drawing Sheets

PROVIDING SEARCH RESULTS BASED ON KEYWORD DETECTION IN MEDIA CONTENT

FIELD OF THE DISCLOSURE

The present disclosure is generally related to keyword detection.

BACKGROUND

Consumers have an ever increasing amount of available content, including television, Internet, radio, gaming, and other sources. When a consumer has a particular interest, such as for a product or service, the consumer may elect a form of content that is suitable for the particular interest. For example, the consumer may conduct an Internet search to locate websites related to the particular interest or may view television programming that may be related to the particular interest. However, keyword-based searches of the Internet can limit results to the particular keywords chosen by the consumer. Television programming may provide the consumer with programming that discusses or references the consumer's particular interest, such as in a conversation between two characters of a television program. Such a conversation may present the consumer's interest in a particularly compelling or creative manner but may not present a sufficient depth of information to satisfy the consumer.

DETAILED DESCRIPTION

In a particular illustrative embodiment, a system is disclosed that includes a buffer configured to store received media content, a keyword module that is executable by a processor to detect an occurrence of a keyword within the multimedia content at the buffer and to identify additional words within a predetermined proximity to the keyword, and a search module that is executable by the processor to initiate a search including the identified keyword and the additional words.

In a particular illustrative embodiment, a method is disclosed that includes providing a selectable link to be displayed concurrently on a same display device as media content in response to detecting a uniform resource locator (URL) within an audio portion of the media content.

In a particular illustrative embodiment, a method is disclosed that includes sending a stream of media content to a media receiver, scanning the stream of media content to locate at least one designated keyword within the stream of media content, and providing a search result to be displayed concurrently with the media content. The search result contains results of a search using the identified designated keyword.

In a particular illustrative embodiment, a computer-readable storage medium is disclosed that includes operational instructions that, when executed by a processor, cause the processor to scan a stream of media content to locate at least one keyword within a portion of the stream of media content, and operational instructions that, when executed by a processor, cause the processor to send instructions to a media receiving device to provide a search result to be displayed concurrently with the portion of the stream of the media content. The search result contains results of a search using the identified keyword.

In a particular illustrative embodiment, a method is disclosed that includes receiving at least one keyword, scanning a stream of media content to identify the keyword within the stream of media content, initiating a network search of the keyword in response to identifying the keyword in the stream of media content, and sending results of the search and the media content to a media receiving device to be concurrently displayed at a single display device.

Figure 1:
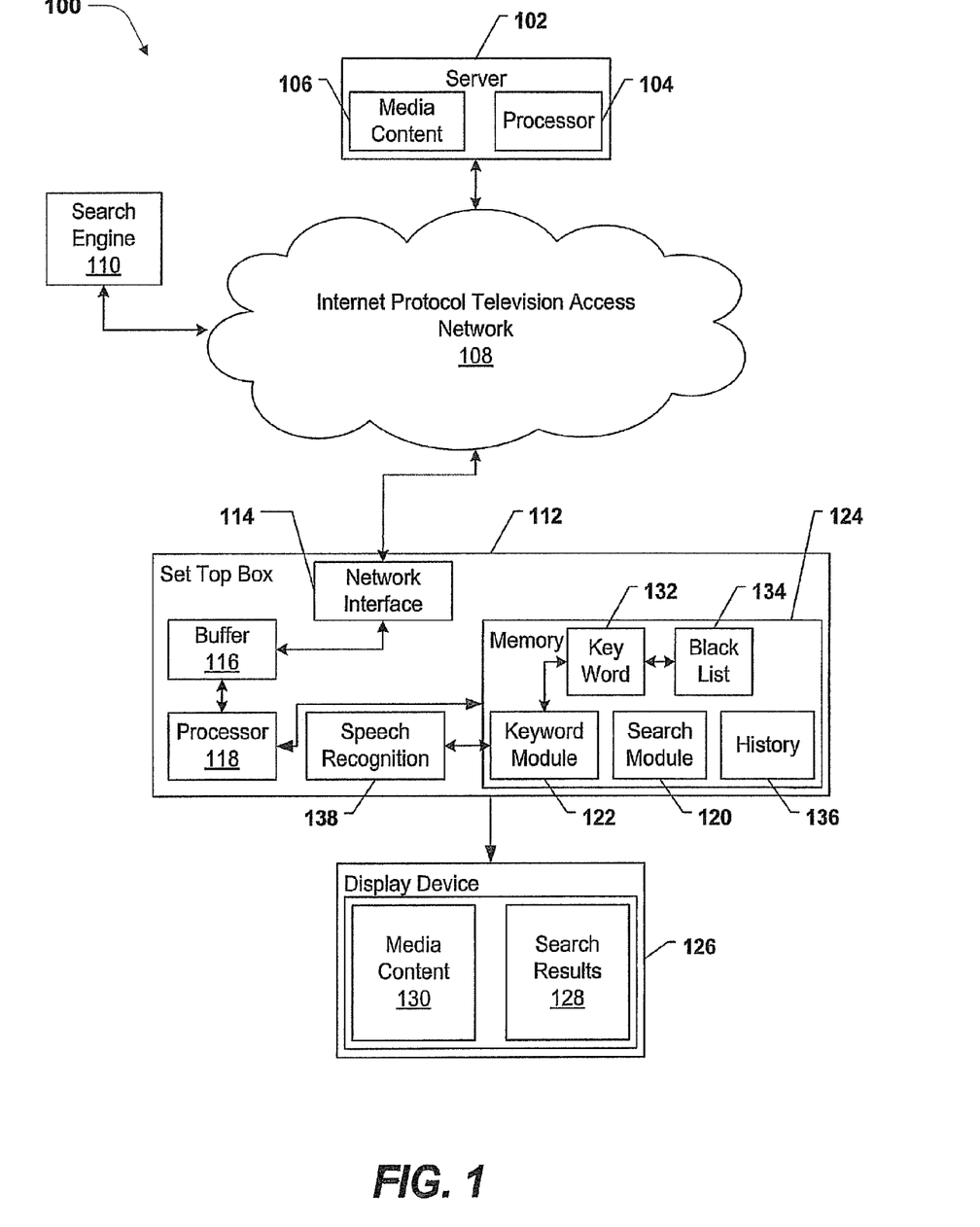
FIG. 1 is a block diagram of a particular illustrative embodiment of a system to detect a keyword or a URL in a media stream.

Referring to FIG. 1, a system to detect keywords and uniform resource locators (URL) in media content is depicted and generally designated 100. The system 100 includes a server 102 in communication with a media receiver, such as a representative set-top box device 112 via a network 108, such as an Internet Protocol Television (IPTV) access network. The set-top box device 112 is coupled to a display device 126. In addition, a search engine 110 is in communication with the set-top box device 112 via the network 108. The system 100 identifies occurrences of a selected keyword and provides associated information at the display device 126 concurrently with the display of the media content to a viewer.

In a particular embodiment, the server 102 includes a processor 104 and the server 102 stores or has access to media content 106. The server 102 may be configured to receive requests for the media content 106 and to initiate a stream of the media content 106 to the requester. For example, the server 102 may be a video server, such as a server of an IPTV distribution system. In a particular embodiment, the media content 106 may include any combination of video content, audio content, closed captioning content, white space content, or other types of content. For example, the media content 106 may include media content or television content.

In a particular embodiment, the search engine 110 may be configured to receive requests for network searches and to return results of searches performed in response to the requests. For example, the search engine 110 may receive a request including one or more keywords, and may initiate an Internet search using the one or more received keywords. In addition, the search engine 110 may generate a list of one or more web sites or other resources matching the requested keywords, and provide a reply to the sender of the request.

In a particular embodiment, the set-top box device 112 includes a processor 118 coupled to a memory 124. The set-top box device 112 also includes a buffer 116 that is configured to store media content received by the network interface 114. The set-top box device 112 is configured to receive media content via the network 108, to buffer the content using the buffer 116, to decode and process the media content using the processor 118, and to provide the decoded and processed media content to display at the display device 126.

In a particular embodiment, the set-top box device 112 includes a keyword module 122 that is executable by the processor 118 to detect an occurrence of the identified keyword 132 in the media content. In a particular embodiment, the keyword module 122 may be configured to access media content stored at the buffer 116 and to identify additional words within a pre-determined proximity to the identified keyword 132 detected at the buffer 116. For example, in a particular embodiment, a user may select or determine one or more user selected keywords 132 that are stored at the memory 124. The keyword module 122 may be configured to perpetually scan media content that is buffered at the buffer 116 and to determine occurrences of one or more of the user selected keywords 132 at the buffer 116. In a particular embodiment, the keyword module 122 may be configured to search through a white space area of the media content or a closed-captioned portion of the media content. In a particular embodiment, the set-top box device 112 includes a speech recognition engine 138 and the keyword module 122 may be configured to search through the audio portion of the media content by using a speech recognition engine 138. In a particular embodiment, the set-top box device may include a black list 134 and the black list 134 may include a default, or user specified terms that the search module 120 may use to generate a search query using the processed data. For ease of explanation, reference will be made to a single user selected keyword 134. However, it should be understood that systems and methods of the present disclosure may operate using more than one selected keyword 134 may be used. In a particular embodiment, selected keyword 134 may be provided by a user, a content provider, and/or a service provider.

In a particular embodiment, the keyword module 122 may search the buffer for one or more keywords 132 that may identify a URL, such as a generic top-level domain (gTLD) (e.g., .biz, .com, .info, .name, .net, .org, .pro). Once the keyword 132 is detected, in the media content, the keyword module 122 may be configured to access media content stored at the buffer 116 and to identify the word immediately preceding or succeeding the identified keyword 132 to create a URL. As another example, the keyword 132 may be "www" or "http://" and when the keyword module 122 detects the keyword 132, immediately following words are obtained from buffer 116 to create a URL. The URL may be included in a hypertext transfer protocol (http) request to access a web site or the URL may be sent to the search module 120 that may initiate and send a search request to the search engine 110.

In a particular embodiment, the search module 120 is executable by the processor 118 to initiate an Internet search in response to a detection of an identified keyword 132 by the keyword module 122. For example, the search module 120 may be responsive to the keyword module 122 and, upon detection of the identified keyword 132, the search module 120 may initiate and send a search request to the search engine 110. The search module 120 may further be configured to receive search results from the search engine 110, and to prepare the search result for display at the display device 126.

In a particular embodiment, the set-top box device 112 is configured to display the search results 128 concurrently with displaying the media content 130 that includes the identified keyword 132 that triggered the search. As a result, a viewer of the display device 126 may be able to view the media content 130 and when a selected keyword is detected in the media content, to view a display of search results 128 concurrently at the display device 126. In a particular embodiment, the set-top box device 112 includes a history of search results 136. The history of search results 136 may be accessible by a user to view search results 128 after the media content 130 has been viewed.

During operation, a user of the set-top box device 112 may select the user identified keyword 132 to be used by the keyword module 122. For example, the user may select or otherwise designate a keyword such as "cars" or "AT&T U-verse$^{SM}$". Once the user identified keyword 132 is designated by the user, the keyword 132 is stored in the memory 124 for access by the keyword module 122. After designating the user identified keyword 132, the user of the set-top box device 112 may engage in viewing media content. For example, the user may select one or more television channels to view at the display device 126. In response to a request from the user to tune to one or more channels, the set-top box device 112 may generate and send a request to the server 102. In response, the server 102 initiates a stream of media content to the set-top box device 112 via the network 108.

As the media content is received at the set-top box device 112, the media content may be buffered at the buffer 116. The buffer 116 may temporarily store the media content, and the keyword module 122 may be executed by the processor 118 to search through an audio portion of the media content at the buffer 116. In a particular embodiment, the keyword module 122 may be configured to search through a white space area of the media content, a closed-captioned portion of the media content, or the audio portion of the media content, such as by using the speech recognition engine 138.

When the keyword module 122 detects an occurrence of the identified keyword 132 in the media content stored at the buffer 116, the keyword module 122 may detect or to locate additional words in the media content within a pre-determined region or range of the identified keyword 132. For example, the keyword module 122 may be configured to identify words or other terms used in the media content within ten words in advance of or following the occurrence of the identified keyword 132. In a particular embodiment, the user can select the region or range of the additional words from the identified keyword 132. In a particular embodiment, if the user identified keyword 132 is part of a URL, the keyword module 122 may be configured to detect of locate additional words that will complete the URL. For example, if the identified keyword 132 is a top-level domain identifier such as .com, then the keyword module 122 is configured to search the buffer 116 or otherwise detect the or locate the word preceding to the word ".com" to complete and generate the URL. In a particular embodiment, detecting the URL includes the keyword module 122 configured to search the audio portion of the media stream with speech recognition engine 138 to identify an occurrence of a top-level domain identifier in the audio portion of the media stream.

After detecting the keyword 132 and one or more additional words in proximity to the keyword 132, the keyword module 122 may provide the keyword 132 and the identified additional words to the search module 120. The search module 120 may receive the keyword 132 and the additional words, and may process the received words prior to generating a search. For example, the search module 120 may remove terms that may not provide significant context to the keyword 132, such as prepositions (e.g., "of", "to", "in", "for", and "on") and may further process the received terms by comparison against the black list 134. In a particular embodiment, the black list 134 may include a default or user specified terms that the search module 120 may use to generate a search query using the processed data.

The search query may be sent via the network interface 116 to the search engine 110. In response, the search engine 110 may conduct a network search such as an Internet search, and may send the search results to the set-top box device 112. In a particular embodiment, if the user identified keyword 132 is part of a URL, the set-top box 112 may generate a http request to access the web address identified by the URL. The set-top box device 112 may process the search results 128 or the http request result to be displayed concurrently with the media content 130, for at least a temporary, pre-determined period of time. For example, the search result 128 may be displayed via an overlay that may be displayed for a short period of time, such as one second, two seconds, or some other duration. In a particular embodiment, the duration is user defined and customizable.

In addition, a history of search results 136 may be stored at the memory 124. The history of search results 136 may be accessible by a user to view search results 128 after the media content 130 has been viewed. For example, a user may elect not to interact with the search results 128 while watching the media content 130, such as a television show, and may instead elect to view the history 136 of search results after the television show is over. In a particular embodiment, the search results 128 may include information and may further include selectable links.

By enabling a user of the set-top box device 112 to select keywords of interest to the user, the system 100 enables a near real-time display of additional pertinent information to a viewer of media content in a manner that is relevant to the display of the media content 130. Therefore, a user may be able to, in conjunction with a television show providing a keyword in the audio, view search results including that keyword and contextual words of the media content, for interaction with a further viewing by the user. Hence, a user's enjoyment of a viewing experience may be enhanced.

Figure 2:
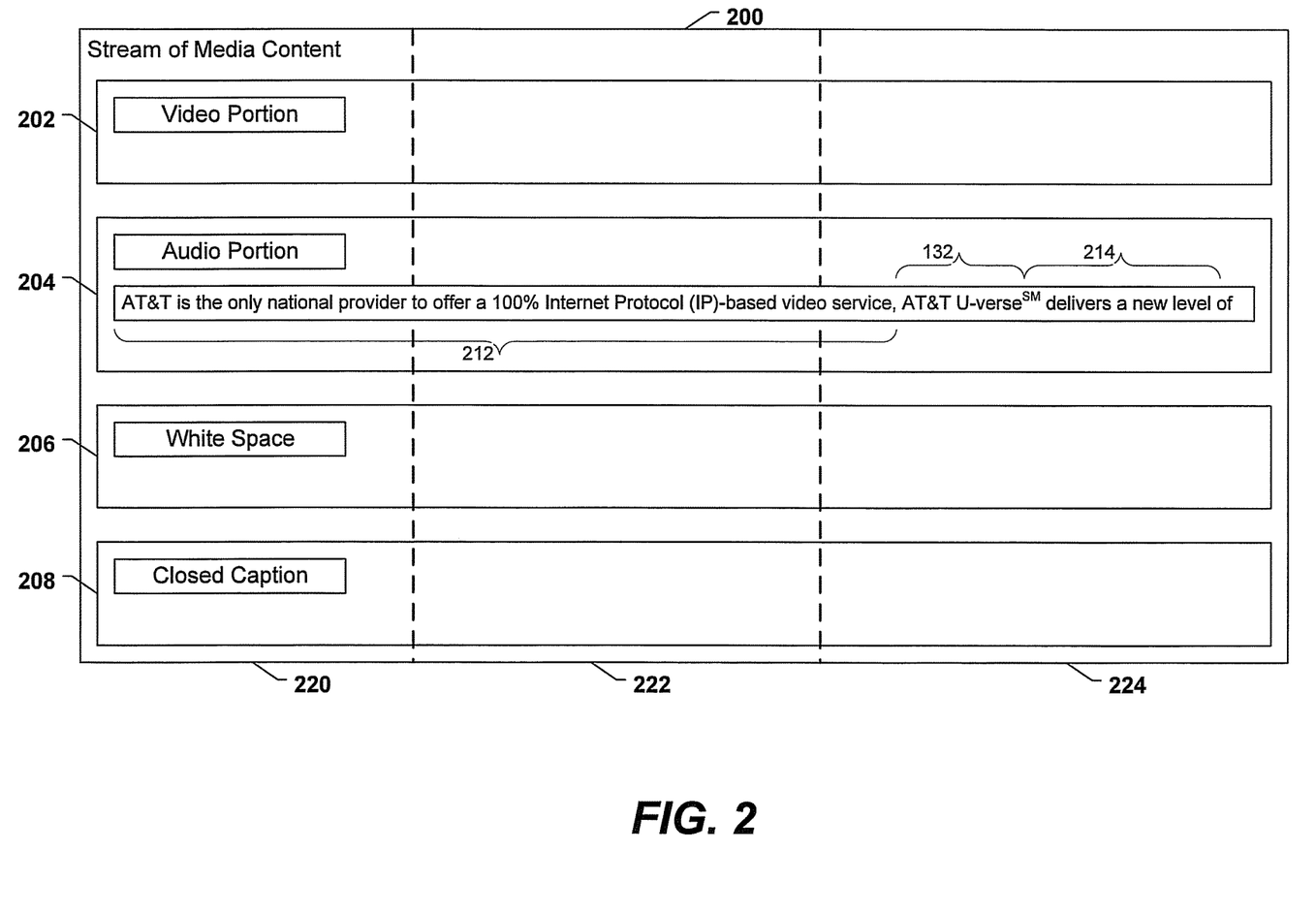
FIG. 2 is a block diagram of a second particular illustrative embodiment of a system to detect a keyword or a URL in a media stream.

FIG. 2 depicts a stream of media content. 200 that may be received at the set-top box device 112 of FIG. 1. The stream of media content 200 contains a video portion 202, an audio portion 204, a white space portion 206 and a closed-captioned portion 208. The video portion 202 contains the video content, if any, in the stream of media content 200. The audio portion 204 contains the audio content, if any, in the stream of media content 200. The white space portion 206 contains the white space content, if any, in the stream of media content 200. The closed-captioned portion 208 contains the closed-caption content, if any, in the stream of media content 200. The stream of media content 200 is depicted as comprising a first segment 220, a second segment 222, and a third segment 224. The segments 220-224 may represent portions of the media content encoded to be delivered via a payload of a data packet in a packet stream and recorded in a buffer of a media receiver such as the one in FIG. 1. The packets may be sent and/or received sequentially or otherwise may be asynchronous.

In a particular embodiment, the audio portion 204 may be scanned by the keyword module 122 using the speech recognition engine 138 to detect the keyword 132. Once the keyword 132 is detected, keyword module 122 may use the buffer 116 to locate words proximate to the user identified keyword 132 in the stream of media content 200. For example, if the user identified keyword 132 is the word "AT&T U-verse", search module 120, using buffer 116, may use words identified in preceding section 212 that are preceding the user identified keyword 132 in a search. Alternatively, the search module 120, using the buffer 116, may use the words identified in the succeeding section 214 that are succeeding the user identified keyword 132 in a search. In a particular embodiment, the search module 120 may use the words both preceding and succeeding the user identified keyword 132 in a search. In a particular embodiment, the search module 120 may scan the white space 206 of the stream of media content 200 to determine the presence of keyword 132. In another particular embodiment, search module 120 may scan closed-captioned portion 208 of the media content 106.

Figure 3:
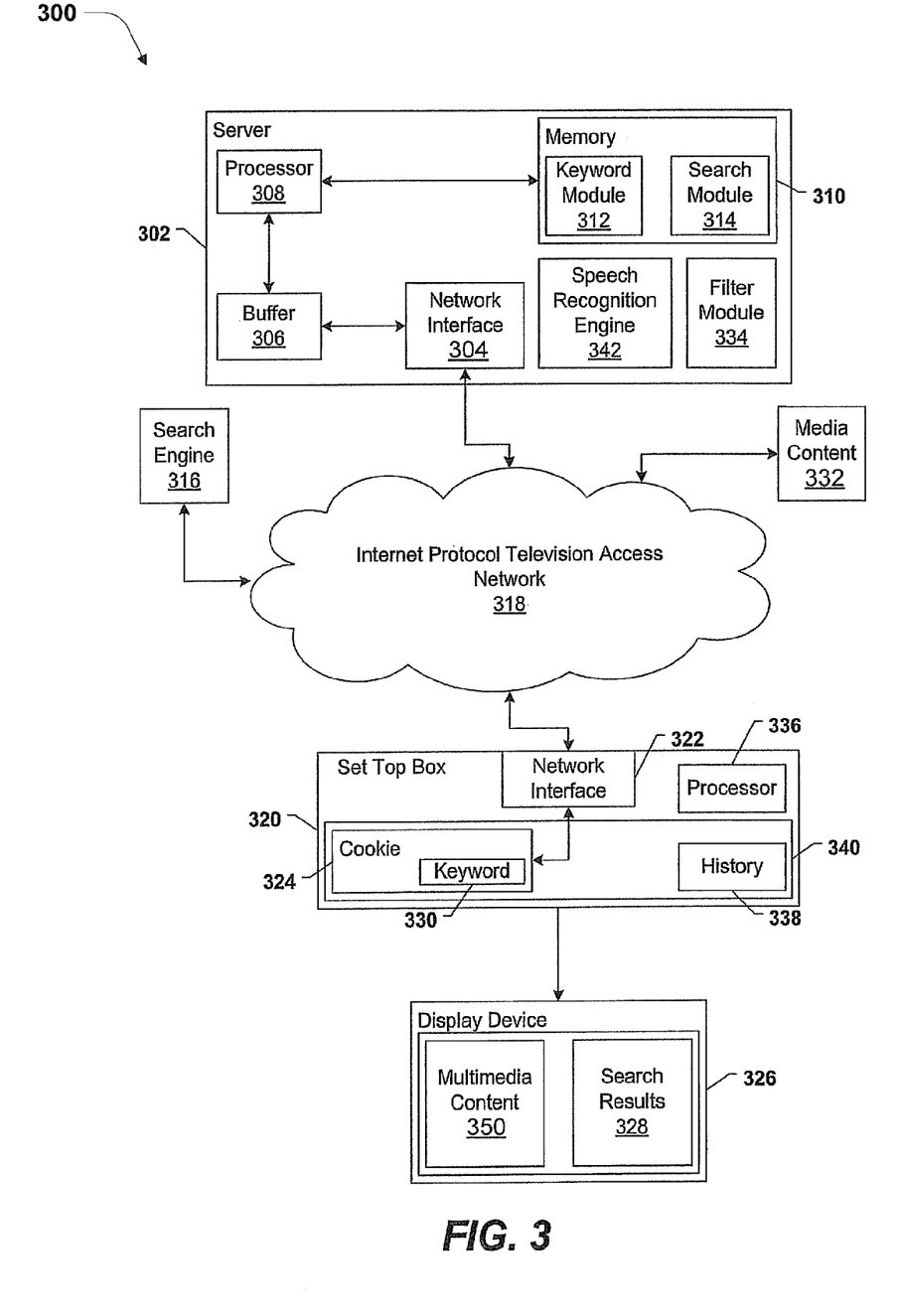
FIG. 3 is a block diagram of a third particular illustrative embodiment of a system to distribute media content.

Referring to FIG. 3, a system to detect keywords and uniform resource locators (URL) in media content is depicted and generally designated 300. The system 300 includes a server 302 in communication with a media receiver, such as a representative set-top box device 320 via a network 318, such as an Internet Protocol Television (IPTV) access network. The set-top box device 320 is coupled to a display device 326. In addition, a search engine 316 is in communication with the server 302 via the network 318.

The server 302 is configured to detect the occurrences of an identified keyword 330 and to provide associated information to the set-top box device 320 to be displayed at the display device 326 concurrently with the display of media content. In a particular embodiment, the server 302 contains a buffer 306 that is configured to store or have access to media content 332 received by a network interface 304. The server 302 may be configured to receive requests for the media content 332 and to initiate a stream of the media content 332 to the requestor. For example, the server 302 may be a video server, such as a server of an IPTV distribution system. In a particular embodiment, the media content 332 may include any combination of video content, audio content, closed captioning content, white space content, or other types of content. For example, the media content 332 may include media content or television content.

In a particular embodiment, the server 302 includes a processor 308 coupled to a memory 310. In a particular embodiment, the server 302 includes a keyword module 312 that is executable by the processor 308 to detect an occurrence of the identified keyword 330. For example, the keyword module 312 may be configured to access media content stored at the buffer 306 and to identify additional words within a pre-determined proximity to the identified keyword 330 detected at the buffer 306. For example, in a particular embodiment, a user may identify, select, or otherwise determine one or more user selected keywords 330 that are stored at the memory 310 or in the cookie 324 at the set-top box 320. If the user identified keyword 330 is stored in a cookie 324 at the set-top box 320, then the keyword module 312 can access the cookie 324 via the network 318. For ease of explanation, reference will be made to only one user identified keyword 330. However, it should be understood that more than one user identified keyword 330 may be used.

In a particular embodiment, the identified keyword 330 is not user identified but instead is predetermined. For example, keyword module 312 may contain a list of pre-determined keywords that the user cannot change. In a particular embodiment, the user can change the pre-determined keywords. For example, the user may be able to add to the list of keywords or delete keywords from the list. In a particular embodiment, the pre-determined keywords may be updated on a regular basis.

The keyword module 312 may be configured to perpetually scan media content that is buffered at the buffer 306 and to determine occurrences of one or more of the selected keywords 330 at the buffer 306. In a particular embodiment, the server 302 includes a filter module 334. In a particular embodiment, the filter module 334 may remove terms that may not provide significant context to the identified keyword 330, allow terms that do provide significant context to the identified keyword 330, or include default or specified terms that the search module 314 may use to generate a search query using the processed data.

In a particular embodiment, the search module 314 includes executable instructions that are executable by the processor 308 to initiate an Internet search in response to a detection of the user identified keyword 330. For example, the search module 314 may be responsive to the keyword module 312 and, upon detection of the user identified keyword 330, the search module 314 may initiate and send a search request to the search engine 316. The search module 314 may further be configured to receive a search result from the search engine 316, and to prepare the search results for display at the display device 326.

In a particular embodiment a link or display on the display device 326 is presented upon detection of the identified keyword 330. For example, during a football game, if a player's name is detected, such as Brett Favre, and the words "Brett Favre" are selected keywords 330, then a link or display on the display device 326 is presented to provide more information about Brett Favre. For example, the link may be a link to access Brett Favre's statistics or his biography. In another example, during a newscast, a reporter may reference a city or country and if the referenced city or country is an identified keyword 330, then a link or display on the display device 326 is presented to the user to provide more information about the referenced city or country.

In a particular embodiment, the search module 314 includes executable instructions that are executable by the processor 308 to present an advertisement in response to the detection of the identified keyword 330. The advertisement may be a link or a display at the display device 326. For example, the identified keyword 330 may be the words "cellphone" and upon detection of the words "cell phone" the user is presented with a link to a web site for information about a particular cell phone service provider or an advertisement for a particular cell phone service provider is displayed at the display device 326.

In a particular embodiment, the search engine 316 may be configured to receive requests for network searches and to return results of searches performed in response to the request. For example, the search engine 316 may receive a request including one or more keywords, and may initiate an Internet search using the one or more received keywords. In addition, the search engine 316 may generate a list of one or more web sites or other resources matching the requested keywords, and provide a reply to the sender of the request.

In a particular embodiment, the set-top box device 320 includes a network interface 322 coupled to a processor 336 and a memory 340. The memory 340 includes a cookie 324 and a history of the search results 338. The set-top box device 320 is configured to receive media content via the network 318, to decode and process the media content using processor 336, and provide the decoded and processed media content to display at the display device 326.

In a particular embodiment, the set-top box device 320 is configured to receive search results from the 302 and to display the search results 328 concurrently with displaying the media content 350 that includes the identified keyword 330 that generated the search. As a result, a viewer of the display device 326 may be able to view the media content 350 and when the identified keyword 330 is detected in the media content 350, to view a display of search results 328 concurrently at the display device 326.

A user of the set-top box device 320 may select a keyword such as "cars" or "AT&T U-verse". Once the user defined keyword 330 is selected by the user, the cookie 324 stores the user identified keyword 330 for access by the keyword module 312 via network 318. After selecting the user selected keyword 320, the user may engage in viewing the media content 350. For example, the user may select one or more television channels to view at the display device 326. In response to a request from the user to receive one or more channels, the set-top box device 326 may generate and send a request to the server 302. In response, the server 302 accesses the user generated keyword 330 and initiates a stream of the media content 332 to the server 302. As the media content 332 is received at the server 302, the media content may be buffered at the buffer 306. The buffer 306 may temporarily store the media content, and the keyword module 312 may be executed by the processor 308 to search through an audio portion of the media content at the buffer 306. In a particular embodiment, the keyword module 312 may be configured to search through a white space area of the media content, a closed-captioned portion of the media content, or the audio portion of the media content, such as by using a speech recognition engine 342 similar to the speech recognition engine 138 shown in FIG. 1.

When the keyword module 312 detects an occurrence of the identified keyword 330 in the media content stored at the buffer 306, the keyword module 312 may further be configured to detect or to locate additional words in the media content within a pre-determined region or range of the selected keywords 324. For example, the keyword module 312 may be configured to identify words or other terms used in the media content within ten words in advance of or following the occurrence of the user identified keyword 330.

After detecting the identified keyword 330 and optionally one or more additional words in proximity to the identified keyword 330, the keyword module 312 may provide the identified keyword 330 and the identified additional words to the search module 314. The search module 314 may receive the identified keyword 330 and the additional words, and may process the received words prior to generating a search. For example, the search module 314 may remove terms that may not provide significant context to the user identified keyword 330, such as prepositions (e.g., "of", "to", "in", "for", and "on"), may include terms that might provide significant context to the user identified keyword 330, and may further process the received terms by comparison against a filter module 334. In a particular embodiment, the filter module 334 may include default or user specified terms that the search module 314 may use to generate a search query using the processed data.

The search query may be sent via the network interface 304 to the search engine 316. In response, the search engine 316 may conduct a network search such as an Internet search, and may send the search results to the network interface 322 of the set-top box device 320. In response, the set-top box device 320 may process the search results 328 to be displayed concurrently with the media content 350, for at least a temporary, pre-determined period of time. For example, the search result 328 may be displayed via an overlay that may be displayed for a short period of time, such as five seconds, ten seconds, 30 seconds, or some other duration. In a particular embodiment, the display time is customizable and set by the user of the set-top box device 320.

In addition, a history of search results 338 may be stored at the set-top box 320. The history of search results 338 may be accessible by a user to view the search results 328 after the media content 350 has been viewed. For example, a user may elect not to interact with the search results 328 while watching the media content 350, such as a television show, and may instead elect to view the history of the search results 338 after the television show is over. In a particular embodiment, the search results 328 may include information and may further include selectable links.

By enabling a user of the set-top box device 320 to select keywords of interest to the user, the system 300 enables a near real-time display of additional pertinent information to a viewer of media content in a manner that is relevant to the display of the media content 350. Therefore, a user may be able to, in conjunction with a television show providing a keyword in the audio, view search results including that keyword and contextual words of the media content, for interaction with a further viewing by the user. Hence, a user's enjoyment of a viewing experience may be enhanced.

Although the media receivers of both FIG. 1 and FIG. 2 are depicted as set-top boxes, in other embodiments they may be: PDA, cell phones, mobile phones, gaming devices, or other similar devices. Also, modules may be the hardware, software, or firmware. In addition, the buffer 306 may be in the network 318 and server 302 may contain the history of the search results 338.

Figure 4:
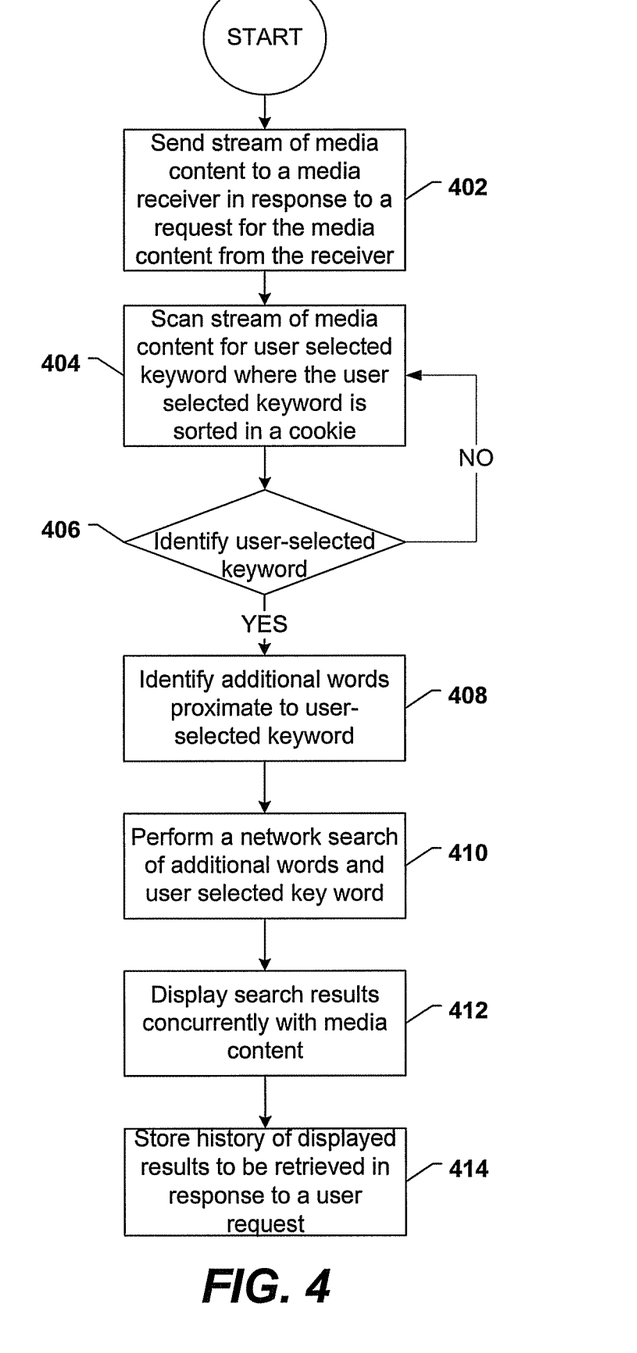
FIG. 4 is a flow diagram of a particular illustrative embodiment of a method of receiving media content.

FIG. 4 is a flow diagram of a particular illustrative embodiment of a method of identifying a selected keyword in a media stream. A media stream is sent to a receiver in response to a request for the media from the receiver, at 402. In a particular embodiment, the receiver may be a set-top box such as the set-top box device 112 of FIG. 1 or the set-top box device 320 of FIG. 3. Moving to 404, the media stream is scanned for a selected keyword. In a particular embodiment, the user selected keyword may be stored in the memory 124 or in a cookie 324 and the keyword module 122 scans the media stream for an occurrence of the user selected keyword. In a particular embodiment, the cookie 324 is access in response to a request from the receiver to provide the media stream.

At decision 406, a determination is made whether or not the selected keyword was identified. If the selected keyword was not identified, then the media stream is scanned again, at 404. Otherwise, if the selected keyword is detected, then additional words proximate to the selected keyword are identified at 408. For example, a buffer, such as the buffer 116 of FIG. 1, may temporarily store the media content contained in the media stream, and the keyword module 122 may be executed by the processor 118 to search through the media content to locate additional words proximate to the user selected keyword.

Continuing to 410, in a particular embodiment, a network search is performed of the user selected keyword and the additional words. If additional words proximate to the user defined keyword were not detected, then only a network search of the user selected keyword may be performed. Advancing to 412, the results of the network search are displayed concurrently with the media content on a single display device. Proceeding to 414, a history of the search results may be stored and may be accessible by a user to view the search results in response to a request by the user.

Figure 5:
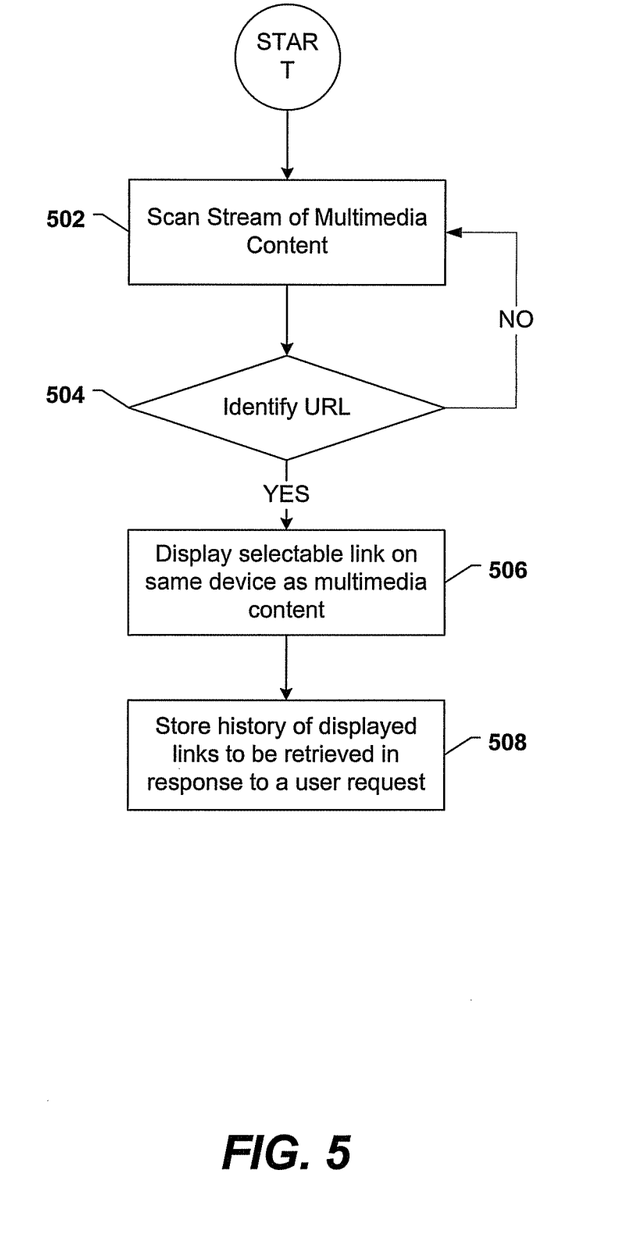
FIG. 5 is a flow diagram of a particular illustrative embodiment of a method of receiving media content.

FIG. 5 is a flow diagram of a particular illustrative embodiment of a method of identifying a URL in media content. A media stream is scanned to determine if a URL is present in the media content contained in the media stream, at 502. For example, the keyword module 122 of FIG. 1 may scan the media stream to determine if a URL is present in the media content contained in the media stream. At decision 504, a determination is made whether or not a URL is present in the media content. If a URL is not contained in the stream of media content, the stream of media content is scanned again, at 502. Otherwise, advancing to 506, if a URL is identified, then a selectable link is displayed on the same device as the media content is displayed. For example, the set-top box device 112 of FIG. 1 may process the URL to be displayed concurrently with the media content. Continuing to 508, in a particular embodiment, a history of the displayed link that was displayed is stored and may be retrieved later in response to a user's request. For example, the history of search results 136 of FIG. 1 may store the results in memory 124 where the results may be accessible in response to a user's request.

Although the particular embodiments of the above-described methods have been presented in a particular sequence, it should be understood that the sequences are presented for illustrative purposes, and that in other embodiments the methods may be performed in a number of alternative sequences. In addition, other embodiments can have more or less steps than depicted.

Figure 6:
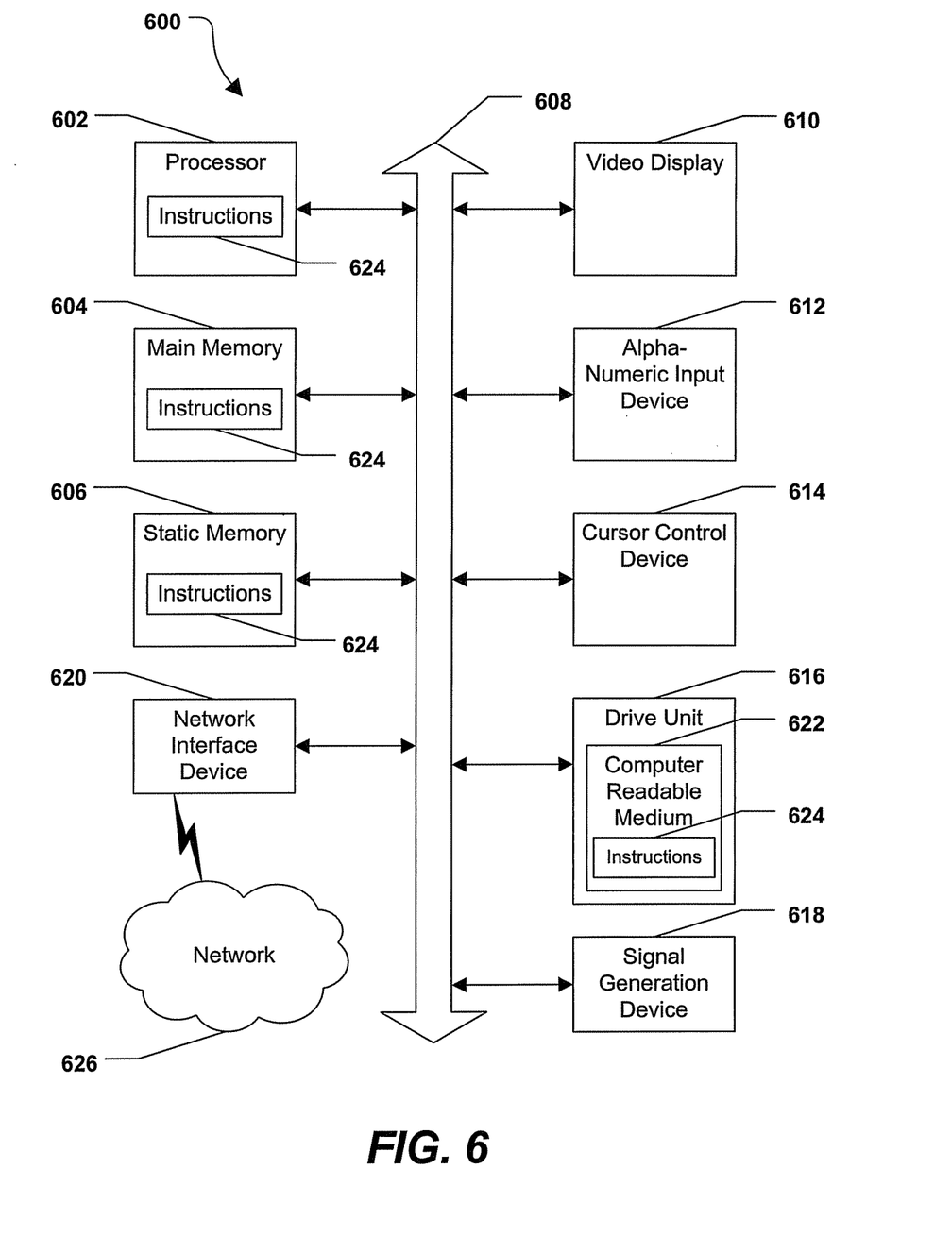
FIG. 6 is a block diagram of a particular embodiment of a general computing system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 can operate as a standalone device or can be connected, e.g., using a network, to other computer systems or peripheral devices, such as the systems and electronic devices shown in FIGS. 1 and 3. For example, the computer system 600 may be included in the server 102, search engine 110, or set-top box device 112 of FIG. 1, or the server 302, search engine 316, or the set-top box device 320 of FIG. 3, or any combination thereof.

In a networked deployment, the computer system can operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 can include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 can further include a video display unit 610, such as a liquid crystal display (LCD), a flat panel display, a solid state display, or projection television. Additionally, the computer system 600 can include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 can include a computer-readable medium 622 in which one or more sets of instructions 624, e.g. software, can be embedded. Further, the instructions 624 can embody one or more of the methods or logic as described herein. In a particular embodiment, the instructions 624 can reside completely, or at least partially, within the main memory 604, the static memory 606, and/or within the processor 602 during execution by the computer system 600. The main memory 604 and the processor 602 also can include computer-readable media.

In an alternative embodiment, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 can be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered equivalent to a tangible storage medium. Accordingly, the disclosure is considered to include any one or more of a computer-readable medium and other equivalents and successor media, in which data or instructions can be stored.

Although the present specification describes components and functions that can be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and can not be drawn to scale. Certain proportions within the illustrations can be exaggerated, while other proportions can be minimized. Accordingly, the disclosure and the figures are to be regarded as illustrative rather than restrictive.

One or more embodiments of the disclosure can be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose can be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
 a processor; and
 a memory accessible to the processor, the memory including instructions that, when executed by the processor, cause the processor to perform operations comprising:
  accessing a cookie file from a media device via a network, wherein a keyword is selected from the cookie file;

detecting an occurrence of the keyword within a portion of a media content stream;
identifying one or more additional words that are located within a number of words from a location corresponding to the occurrence of the keyword within the portion of the media content stream;
filtering the one or more additional words to exclude at least one black listed word to produce a filtered search set; and
in response to the occurrence of the keyword within the portion of the media content stream, performing an Internet search based on the keyword and the filtered search set.

2. The system of claim 1, wherein the processor and the memory are included in a server.

3. The system of claim 1, wherein the media device includes a set-top box device.

4. The system of claim 1, wherein the number of words is ten, and wherein each of the one or more additional words is located at a second location within the portion of the media content stream that is within ten words before the location corresponding to the occurrence of the keyword or ten words after the location corresponding to the occurrence of the keyword.

5. The system of claim 1, wherein the network includes an internet protocol television network.

6. The system of claim 1, wherein the operations further comprise analyzing an audio portion of the portion of the media content stream to detect the occurrence of the keyword.

7. The system of claim 1, wherein the operations further comprise analyzing a closed caption portion of the portion of the media content stream to detect the occurrence of the keyword.

8. The system of claim 1, wherein the operations further comprise analyzing a white space portion of the portion of the media content stream to detect the occurrence of the keyword.

9. The system of claim 1, wherein the operations further comprise sending a search request to a search engine to initiate the Internet search.

10. The system of claim 1, wherein the keyword identifies a particular portion of a uniform resource locator address.

11. The system of claim 10, wherein the particular portion of the uniform resource locator address includes uniform resource locator protocol, a uniform resource locator top-level domain name, or both.

12. The system of claim 10, wherein the particular portion of the uniform resource locator address includes a uniform resource locator top-level domain name, and wherein the uniform resource locator address is formed based on the particular portion of the uniform resource locator address and the one or more additional words.

13. A method comprising:
accessing a cookie file from a media receiver via a network, wherein a keyword is selected from the cookie file;
sending a portion of a stream of media content to the media receiver;
scanning the portion of the stream of media content to locate the keyword within the portion of the stream of media content;
identifying one or more additional words that are located within a number of words from a location corresponding to an occurrence of the keyword within the portion of the stream of media content;
filtering the one or more additional words to exclude at least one black listed word to produce a filtered search set; and
providing a search result in response to locating the keyword within the portion of the stream of media content, wherein the search result is based on an Internet search conducted using the keyword and the filtered search set, and wherein the search result is made accessible via a display device after the portion of the stream of media content is made available via the display device.

14. The method of claim 13, wherein the cookie file is accessed in response to receiving a request to provide the portion of the stream of media content to the media receiver.

15. The method of claim 13, wherein the at least one black listed word is a user-defined.

16. The method of claim 15, wherein the media receiver is a set-top box device.

17. The method of claim 13, wherein the search result includes information identifying one or more websites associated with the keyword.

18. The method of claim 13, wherein filtering the one or more additional words to produce the filtered search set further includes filtering the one or more additional words to exclude one or more prepositions.

19. A computer-readable storage device storing instructions that, when executed by a processor, cause the processor to perform operations comprising:
accessing a cookie file from a media device via a network, wherein a keyword is selected from the cookie file;
scanning a stream of media content to locate the keyword within a portion of the stream of media content;
identifying one or more additional words that are located within a number of words from a location corresponding to an occurrence of the keyword within the portion of the stream of media content;
filtering the one or more additional words to exclude at least one black listed word to produce a filtered search set; and
providing a search result in response to locating the keyword within the portion of the stream of media content, the search result based on an Internet search conducted using the keyword and the filtered search set, wherein the search result is made accessible via a display device after the portion of the stream of media content is made available via the display device.

20. The computer-readable storage device of claim 19, wherein the operations further comprise conducting the Internet search based on the filtered search set and the keyword.

21. A method comprising:
accessing a cookie file from a media device via a network, wherein a keyword is selected from the cookie file;
scanning a portion of a stream of media content to identify the keyword within the portion of the stream of media content;
identifying one or more additional words that are located within a number of words from a location corresponding to an occurrence of the keyword within the portion of the stream of media content;
filtering the one or more additional words to exclude black listed words to produce a filtered search set;
initiating a network search of the keyword and the filtered search set in response to identifying the keyword in the portion of the stream of media content; and
receiving results of the network search, wherein the results of the network search are made accessible after the portion of the stream of media content is made available via a display device.

22. The method of claim 21, further comprising performing the network search based on the filtered search set.

23. The method of claim 21, further comprising sending the results of the network search to the display device via an internet protocol television access network.

* * * * *